Figure 1:
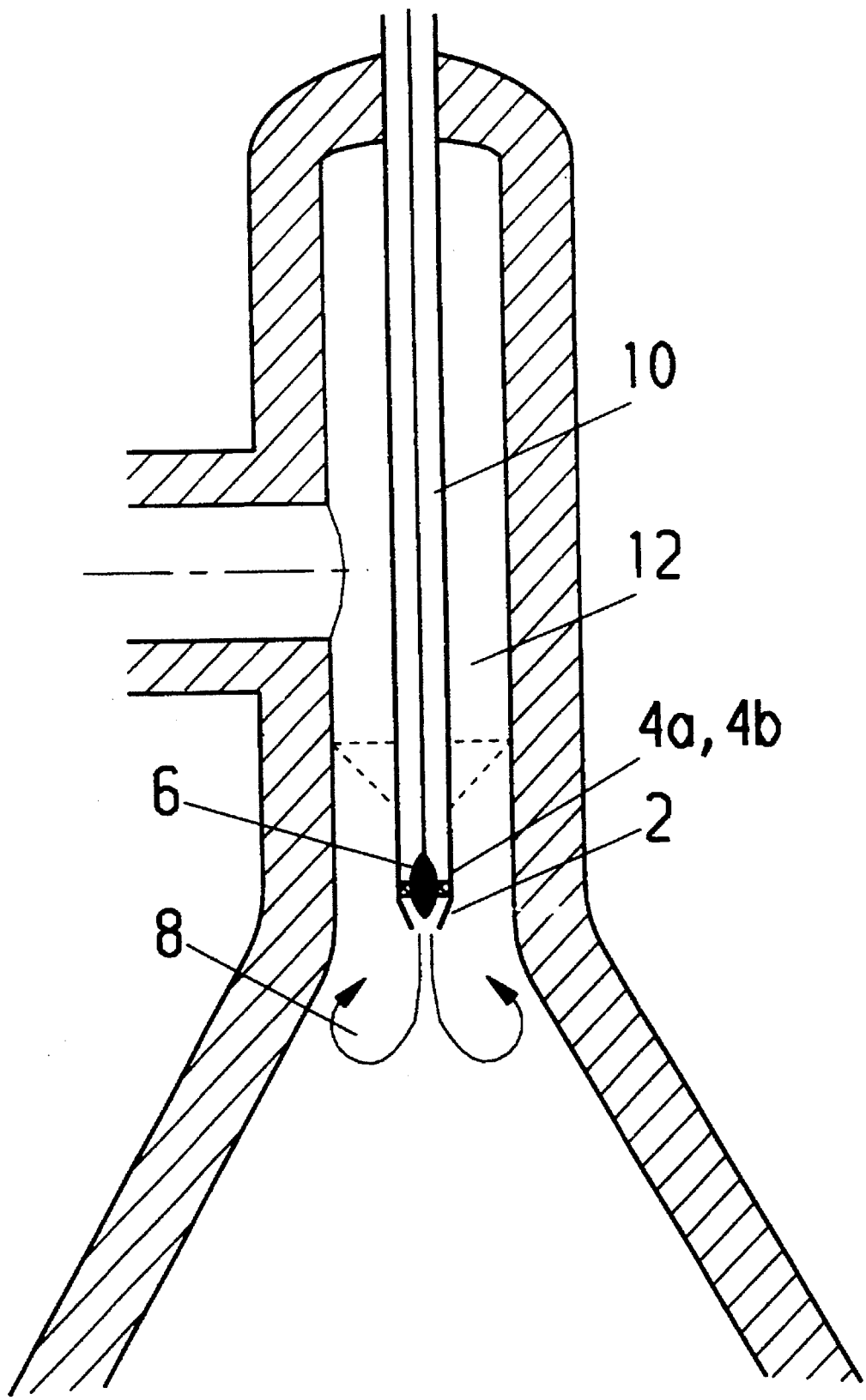

United States Patent [19]

Christensen

[11] Patent Number: 5,492,649
[45] Date of Patent: Feb. 20, 1996

[54] PROCESS FOR SOOT-FREE PREPARATION OF HYDROGEN AND CARBON MONOXIDE CONTAINING SYNTHESIS GAS

[75] Inventor: Thomas S. Christensen, Copenhagen, Denmark

[73] Assignee: Haldor Topsøe A/S, Denmark

[21] Appl. No.: 352,598

[22] Filed: Dec. 9, 1994

[30] Foreign Application Priority Data

Dec. 10, 1993 [DK] Denmark ................................. 1386/93

[51] Int. Cl.$^6$ ................................ C07C 1/02; C06D 3/00
[52] U.S. Cl. ........................................... 252/372; 252/373
[58] Field of Search ..................................... 252/372, 373

[56] References Cited

U.S. PATENT DOCUMENTS 3,920,579  11/1975  Slater ......................................... 252/372

FOREIGN PATENT DOCUMENTS 0168128  1/1986  European Pat. Off. ............... 252/373

Primary Examiner—Werren B. Lone
Attorney, Agent, or Firm—Ostrolenk, Faber, Gerb & Soffen

[57] ABSTRACT

Process for soot-free preparation of hydrogen and carbon monoxide containing synthesis gas, comprising partial oxidation of a steam containing carbonaceous process gas at low temperature and at low steam carbon ratio in a reactor having an upper portion with process gas and oxidizer inlet means and a lower portion with a catalyst bed, wherein a stream of the process gas is injected in a stream of oxidizer gas, which oxidizer gas has been brought into a swirling motion to obtain a maximum number of mixing points for the process and oxidizer gas and to provide substantial soot-free partial oxidation of the process gas.

5 Claims, 1 Drawing Sheet

PROCESS FOR SOOT-FREE PREPARATION OF HYDROGEN AND CARBON MONOXIDE CONTAINING SYNTHESIS GAS

The present invention is directed to the preparation of hydrogen and carbon monoxide rich gas. In particular, the invention is related to a process for soot-free secondary steam reforming or autothermal catalytic reforming of a hydrocarbon feedstock.

Hydrogen and carbon monoxide rich gas is mainly used as synthesis gas in the production of ammonia, methanol or other organic compounds. The gas is further employed during steel production and as fuel or town gas. Depending on the desired composition, the synthesis gas is produced either by a sequence of primary and secondary steam reforming or by autothermal reforming of a suitable hydrocarbon feedstock. During primary and secondary steam reforming, a feed stream is steam reformed in a tubular primary reformer by contact with a steam reforming catalyst to a hydrogen and carbon monoxide containing primary reformed gas, the carbon monoxide content of which is further increased in a secondary reformer. The secondary reformer consists of a cylindrical refractory lined vessel with a gas mixer, usually in form of a burner in the inlet portion of the vessel and a bed of nickel catalyst in the lower portion. The exit gas from the primary reformer is mixed with air and residual hydrocarbons, and the mixed gas partial oxidized to carbon monoxides.

In autothermal catalytic reforming, the hydrocarbon feedstock is partially combusted with air, oxygen, or oxygen-riched air in a burner mounted at the top of a refractory lined reaction vessel. Oxygen is in the above processes supplied in amounts which are less than the amount required for complete combustion. Hydrogen and carbon monoxide are, thereby, produced in an effluent gas mainly by flame reaction:

$$C_nH_m + n/2 O_2 \rightarrow nCO + m/2\ H_2 \quad (1)$$

$$C_nH_m + nO_2 \rightarrow nCO_2 + m/2\ H_2O \quad (2)$$

Both reactions are strongly exothermic for all hydrocarbons. Partial oxidation is typically carried out at temperatures of about 900°–1400° C. Steam is added to the feed in order to moderate the flame temperature and to increase hydrocarbon conversion in the effluent gas.

In operating the above processes, suitable hydrocarbon feed, if necessary, after preheating is introduced at the top of the reactor and burned with an oxidizer gas.

In addition to the above reforming reactions, certain soot forming reactions may occur during burning of the feed:

$$C_nH_m \rightarrow nC + m/2\ H_2 \quad (3)$$

$$2CO \rightarrow C + CO_2 \quad (4)$$

Carbon soot thereby formed in the oxidized gas is detrimental in several ways. It decreases the activity of the catalyst by plugging its active sites and causes spalling and pulverization of catalyst particles, resulting in increasing pressure drop over the catalyst bed and hence discontinuations of the process due to clogging of the reaction system. Furthermore, soot contained in the product gas leaving the reactor has to be removed by a number of subsequent process steps including filtering and scrubbing of the gas.

It is well-known to prevent soot formation by increasing the steam to hydrocarbon ratio or by reducing the molecular weight of the feedstock to reduce the potential for carbon formation.

It has also been observed that carbon formation decreases by proper selection of certain other reaction parameters. The most important parameters to be controlled are pressure, temperature and reformer feed gas composition. Thus, at increasing temperatures in the reactor, soot formation is suppressed even at lower steam hydrocarbon ratio.

High temperatures, however, are detrimental because of wear of the burner being used for mixing process gas and the oxidizer and corrosion of the refractory lining in the upper part of the reactor. When using low temperatures, the necessary high steam to hydrocarbon ratio necessitates recycling of excessive steam and the processing of a larger gas volume. It is, therefore, desirable to minimize the magnitude of the process gas volume and operating at lower temperatures in the reactor without the above drawback.

It has now been found that when mixing an oxidizer stream with a hydrocarbon and steam containing process gas stream at a large number of mixing points, soot formation during burning of process gas is substantially avoided even at very low steam concentrations in the gas.

It has further been observed that a swirling flow of the oxidizer stream mixed with a turbulent flow of process stream provides an optimum number of mixing points and at the same time reduces wear of injection nozzles and reactor wall, which otherwise is caused by excessive recirculation of hot combustion products in a combustion zone adjacent to the injection area.

Based on the above findings and observations, this invention provides an improved process for the soot-free preparation of hydrogen and carbon monoxide containing synthesis gas. The process comprises partial oxidation of a carbonaceous and steam containing process gas at low temperature and at low steam-carbon ratio in a reactor having an upper portion with process gas and oxidizer inlet means and a lower portion with a catalyst bed, wherein a stream of the process gas is injected into a stream of oxidizer gas, which oxidizer gas has been brought into a swirling motion to obtain a maximum number of mixing points for the process gas and oxidizer gas and to provide a soot-free partial oxidation of the process gas.

The above process will conveniently be carried out in a refractory lined cylindrical reactor provided with separate inlets for the process gas and the oxidizer gas, which is suitable air or oxygen enriched-air.

A swirling flow of the oxidizer stream after introduction into the reactor may be obtained by passing the stream through an injector nozzle being provided with swirler blades installed in a tube for supply of the oxidizer stream. The tube is mounted in the centre of the inlet portion of the reactor and concentrically surrounded by a process gas supply channel. The supply channel is as previously mentioned lined with a refractory material conventionally used in those reactors in order to protect the reactor wall against high temperatures.

In a preferred embodiment of this invention, the oxidizer supply tube is provided with a bluff body being surrounded by a section with blades or vanes creating the swirling flow and accelerating the oxidizer stream when passing through the tube. The injector nozzle is further provided with an injection chamber having a tapered or U-shaped contour. The contour of the injection chamber ensures an inwardly directed swirling flow of the oxidizer stream, and provides recirculation of hot combustion products externally in the combustion zone. The external recirculation of combustion products prevents extensive flame impingement on the reactor wall surrounding the combustion zone.

The above and other features of the invention will be referred to in more detail by the following Examples.

EXAMPLE 1

In the production of synthesis gas (mixtures of CO and $H_2$), an autothermal reforming process is applied. The process is performed by partially combustion and catalytic steam reforming reactions carried out in an adiabatic reactor. The hydrocarbons are partially oxidized by substochiometric combustion in flame reactions (1) and (2). The feed stream and oxidizer stream are mixed as previously described and reacted in a turbulent diffusion flame. The design of the oxidizer injector nozzle used in the process ensures two essential parameters of the combustion reaction in autothermal reforming:

(1) Soot-free combustion.

(2) Low burner wear due to the flow pattern in the combustion zone.

In the Example, synthesis gas is produced by the below conditions:

|  | Hydrocarbon Feed | Oxidizer Feed | Catalyst Inlet | Catalyst Outlet |
|---|---|---|---|---|
| Temp. (°C.) | 480 | 190 | 1240 | 1000 |
| Pres. (bar) | 25.0 | 25.0 | 24.2 | 24.0 |
| Flow (Nm³/hr) | 155 | 89.0 | 349.0 | 376.0 |
| Comp (mole %) |  |  |  |  |
| $O_2$ | 0.0 | 68.07 | 0.0 | 0.0 |
| $H_2$ | 1.93 | 0.0 | 39.79 | 48.94 |
| $H_2O$ | 37.15 | 31.88 | 32.15 | 24.94 |
| $N_2$ | 0.30 | 0.05 | 0.13 | 0.14 |
| CO | 0.0 | 0.0 | 17.80 | 21.01 |
| $CO_2$ | 0.60 | 0.0 | 5.05 | 4.87 |
| $CH_4$ | 58.21 | 0.0 | 5.00 | 0.09 |
| $C_2H_6$ | 1.32 | 0.0 | 0.01 | 0.0 |
| $C_3H_8$ | 0.29 | 0.0 | 0.0 | 0.0 |

These conditions have been operated with three different burner types:

(a) Straight flow channels.

(b) Cone type with internal and external recirculation.

(c) Swirler type oxidizer injector and U-shaped hydrocarbon and oxidizer channels and with only external recirculation (cf. FIG. 1) according to the invention.

Operation with these burner types showed that Type (a) was not able to perform soot-free combustion and was suspected to burner wear. Type (b) as able to operate soot-free but has a very high wear rate resulting in a low burner life time because of internal recirculation of hot combustion products. Type (c) was able to both operate soot-free and to have a low wear rate resulting in a long burner lifetime.

The Figure shows the inlet section of an autothermic operated reforming reactor with an oxidizer injection nozzle 2 provided with bluff body (6) being surrounded with swirler plates for (4a, 4b). The oxidizer gas is supplied through gas supply channel 10 and injected in a combustion zone 8. In combustion zone the swirling oxidizer gas stream is mixed with process gas, which is supplied through process gas channel 12. Thereby a plurality of mixing points for the process gas and oxidizer gas is obtained in combustion zone 8.

EXAMPLE 2

For production of synthesis gas for e.g. synthesis of ammonia or methanol, the conventional process includes a primary tubular reformer followed by a secondary reformer. The partly converted gas from the primary reformer is in the secondary reformer combusted by either air or oxygen followed by a catalyst bed for equilibration of the steam reforming reactions and the water gas shift reaction. In this Example, an injector nozzle as described previously is used.

The principle objects of such nozzle are to obtain:

(1) Mixing of the feed stream for the turbulent diffusion flame.

(2) Soot-free combustion.

(3) Combustion without too high temperatures near the burner surface.

(4) Create an even temperature and flow distribution to the catalyst bed.

(5) Low temperature on the reactor wall.

A typically Example for a secondary reformer in an ammonia plant using air as oxidant is shown below:

|  | Hydrocarbon Feed | Oxidizer Feed | Catalyst Outlet |
|---|---|---|---|
| Temp. (°C.) | 818 | 427 | 1017 |
| Pres. (bar) | 33.0 | 33.0 | 32.0 |
| Flow (Nm₃/hr) | 196750.0 | 49266.0 | 258846.0 |
| Comp (mole %) |  | 21.0 |  |
| $O_2$ | 0.0 | 21.0 | 36.21 |
| $H_2$ | 39.92 | 0.0 | 35.50 |
| $H_2O$ | 42.65 | 0.0 | 15.54 |
| $N_2$ | 0.66 | 79.0 | 15.54 |
| CO | 5.35 | 0.0 | 8.11 |
| $CO_2$ | 5.37 | 0.0 | 4.52 |
| $CH_4$ | 6.05 | 0.0 | 0.13 |

A typical Example for a secondary reformer in a methanol plant using oxygen as oxidant is shown below.

|  | Hydrocarbon Feed | Oxidizer Feed | Catalyst Outlet |
|---|---|---|---|
| Temp. (°C.) | 753 | 362 | 950.0 |
| Pres. (bar) | 37.0 | 37.0 | 35.0 |
| Flow (Nm₃/hr) | 306779.0 | 56174.0 | 425985.0 |
| Comp (mole %) |  |  |  |
| $O_2$ | 0.0 | 49.87 | 0.0 |
| $H_2$ | 33.64 | 0.0 | 44.91 |
| $H_2O$ | 38.78 | 49.88 | 35.19 |
| $N_2$ | 0.18 | 0.0 | 0.13 |
| CO | 4.48 | 0.0 | 12.13 |
| $CO_2$ | 6.51 | 0.0 | 6.47 |
| $CH_4$ | 16.37 | 0.0 | 1.10 |
| Ar | 0.0 | 0.25 | 0.26 |

In plants designed with bypass of part of the hydrocarbon feedstock in the primary reformer and addition directly to the secondary reformer, the process of this invention results in soot-free combustion of the process gas in the secondary reformer.

I claim:

1. Process for soot-free preparation of hydrogen and carbon monoxide containing synthesis gas, comprising partial oxidation of a steam containing carbonaceous process gas at low temperature and at low steam carbon ratio in a reactor having an upper portion with process gas and oxidizer inlet means and a lower portion with a catalyst bed, wherein a stream of the process gas is injected in a stream of oxidizer gas, which oxidizer gas has been brought into a swirling motion to obtain a maximum number of mixing points for the process and oxidizer gas and to provide substantial soot-free partial oxidation of the process gas.

2. Process according to claim 1, in which the swirling motion is obtained by passing the oxidizer gas through a nozzle provided with swirler blades in an oxidizer supply tube connected to the oxidizer inlet.

3. Process according to claim 2, in which the oxidizer supply tube is surrounded by a process gas supply tube and the oxidizer supply tube is mounted in the center of said inlet.

4. Process according to claim 3, in which the swirler blades surround a bluff body disposed in said oxidizer supply tube.

5. Process according to claim 4, in which said nozzle is provided with an injection chamber having a tapered or U-shaped contour to thereby inwardly direct the swirling flow of the oxidizer.

* * * * *